Figure 1:
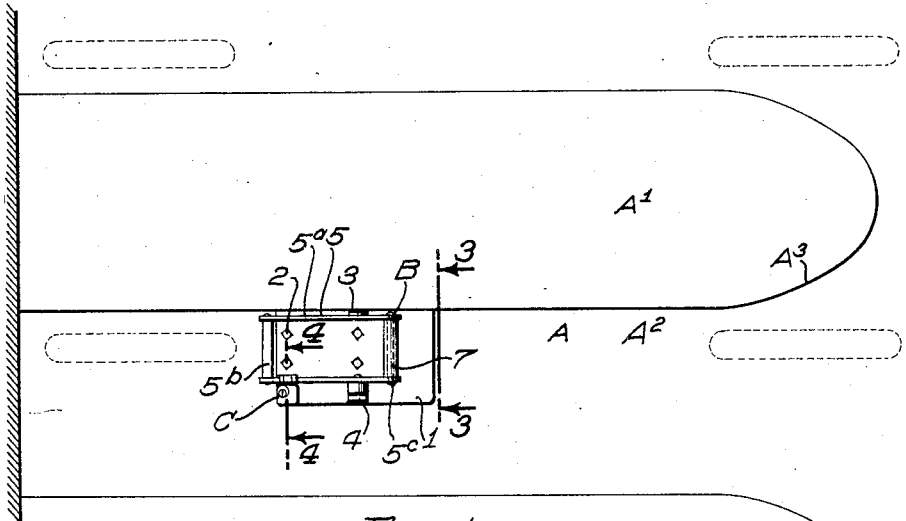

Sept. 3, 1929.  C. J. WARREN  1,726,724
MEANS FOR AND METHOD OF LOCKING VEHICLES IN STALLS
Filed Nov. 5, 1926    3 Sheets-Sheet 1

INVENTOR.
CLINTON J. WARREN
BY A. B. Bowman
ATTORNEY

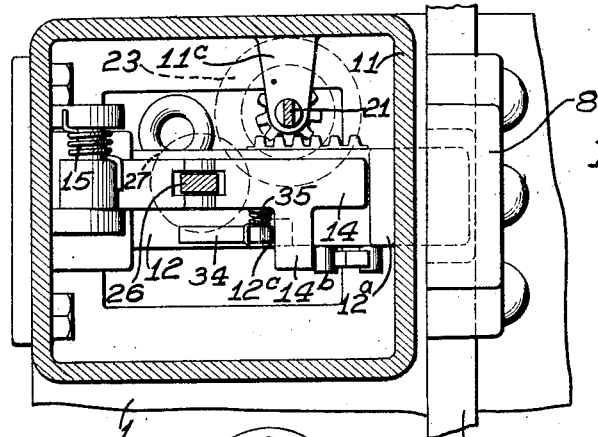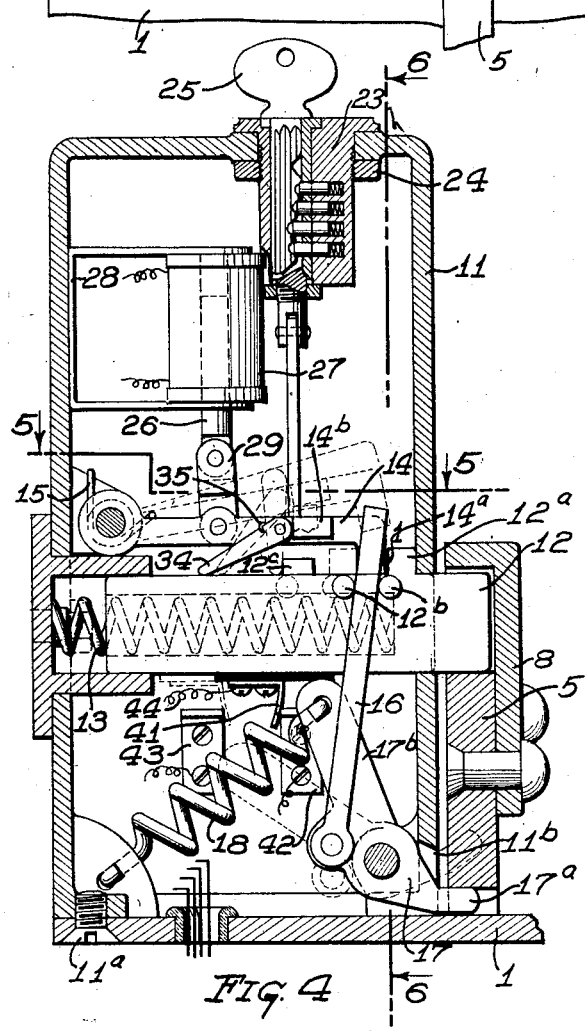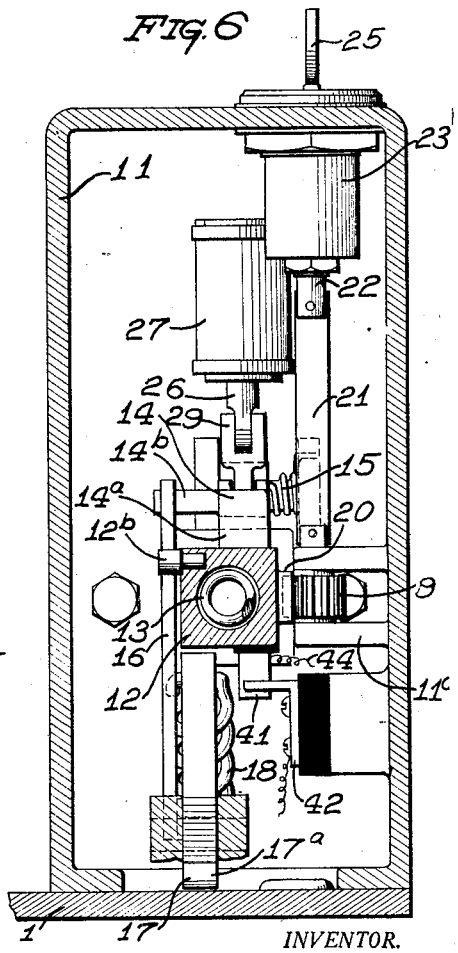

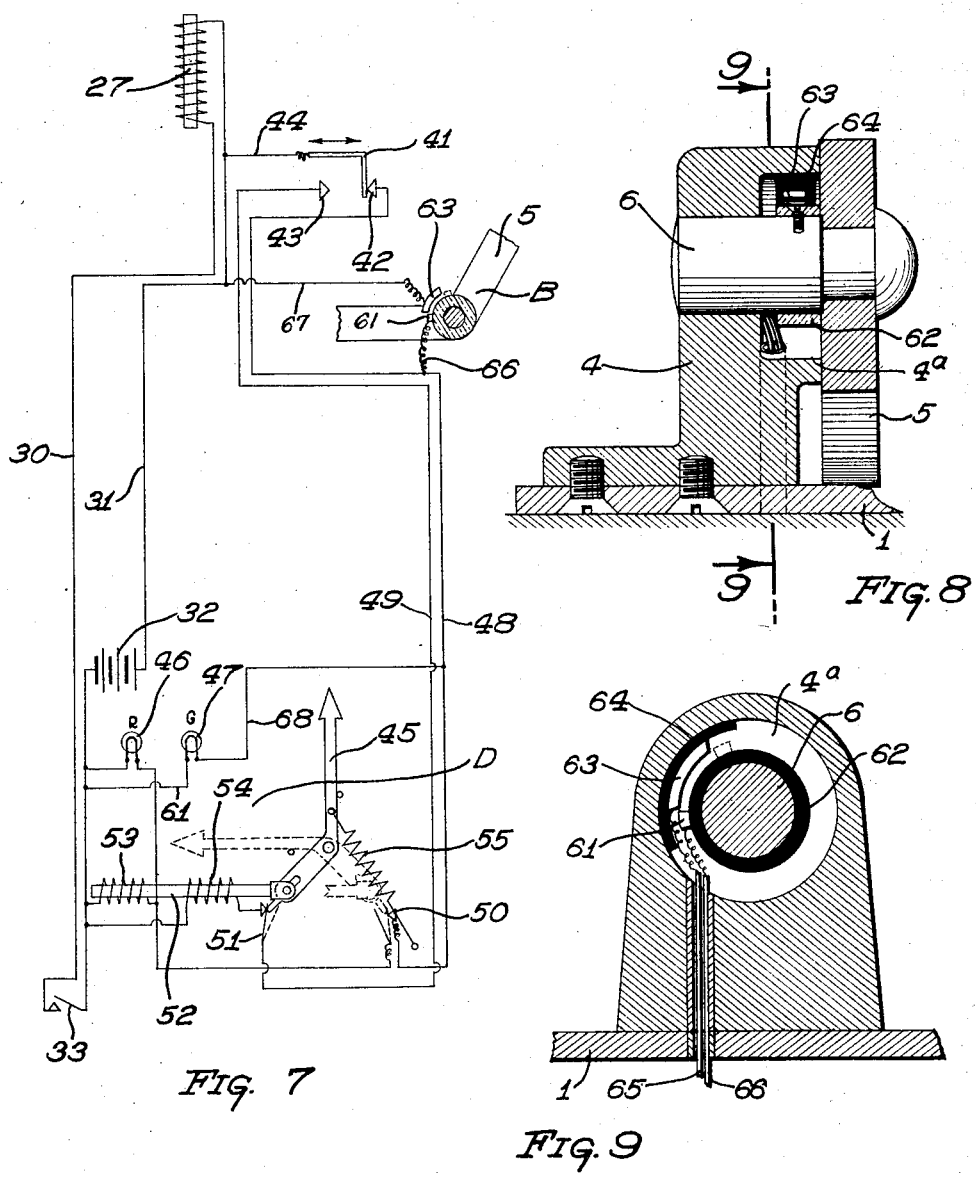

Patented Sept. 3, 1929.

1,726,724

UNITED STATES PATENT OFFICE.

CLINTON J. WARREN, OF WINCHESTER, MASSACHUSETTS.

MEANS FOR AND METHOD OF LOCKING VEHICLES IN STALLS.

Application filed November 5, 1926. Serial No. 146,292.

My invention relates to a means for locking an automobile or vehicle in a stall or runway, to a means for releasing the vehicle, and to a method of locking and releasing the vehicle and of controlling said means.

The objects of my invention are: first, to provide a means of the class mentioned whereby a vehicle may be driven into a stall or runway and be automatically locked therein; second, to provide a means of this class whereby the vehicle may not be driven from the stall or runway unless released by means remote from the stall or runway; third, to provide means of this class whereby the driver, after driving the vehicle into the runway and although having a key for releasing the vehicle, can not drive the vehicle from the runway until the necessary storage charges are paid; fourth, to provide a means of this class whereby, when a vehicle is driven into the runway, an indication is given for recording the time when the vehicle is driven into the runway; fifth, to provide means of this class whereby the vehicle may not be driven from the runway until the driver reports to a remote station where the release of the vehicle is controlled and the elapsed time of the presence of the vehicle in the runway is calculated and the storage charge paid; sixth, to provide a means of this class whereby a signal, indication, or record is made when the vehicle is locked in the runway, and whereby a different signal is given when the vehicle is driven into the runway and not locked therein, as when the operator of the vehicle intends evading a storage charge or when the locking mechanism has been tripped accidentally or through mischief; seventh, to provide novel means for retaining the wheels of an automobile in a runway or a stall, said means being adapted to receive a wheel of the vehicle and automatically raise one end of the means to provide a barrier for the removal of the automobile from the runway or stall; eighth, to provide a novel and positive locking mechanism for means of this class; ninth, to provide novel remote signal means adapted to be controlled by the locking mechanism and also adapted to be controlled by the latter under certain unusual conditions; tenth, to provide as a whole a novelly constructed, arranged and co-operating means of this class; eleventh, to provide a novel method of locking a vehicle in a runway, signalling the presence thereof in the runway, and controlling the release thereof from a remote station; and, twelfth, to provide a means of the class mentioned which is particularly simple and economical of construction proportionate to its functions, durable, efficient, reliable, foolproof, and which will not readily deteriorate or get out of order.

Figure 2:
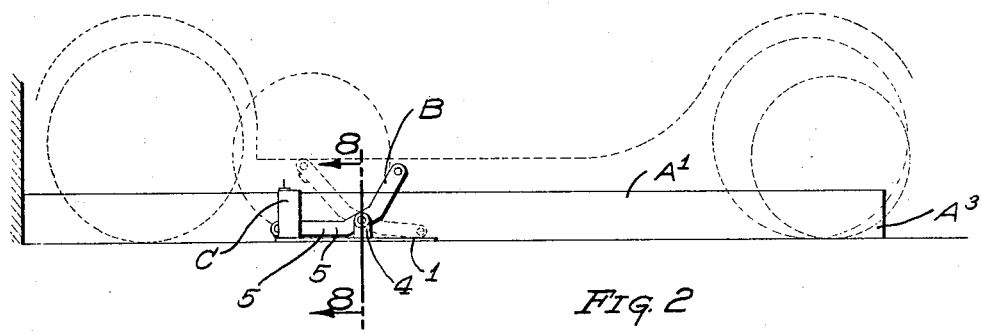
Figure 3:
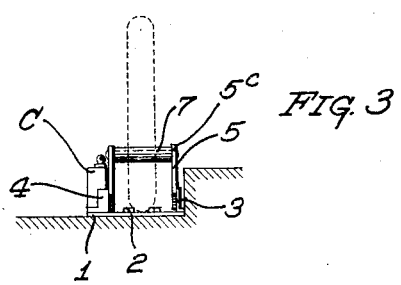

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a plan view of a vehicle runway showing my vehicle locking means in association therewith, the wheels of a vehicle being shown in the runway by dotted lines; Fig. 2 is a side elevational view thereof, showing pairs of large and small wheels by dotted lines representative of long and short vehicles; Fig. 3 is a sectional elevational view thereof taken at 3—3 of Fig. 1; Fig. 4 is an enlarged sectional elevational view of the locking mechanism of my means, the view being taken through 4—4 of Fig. 1, certain parts and portions being shown in elevation to facilitate the illustration; Fig. 5 is a fragmentary partial sectional and partial plan view thereof taken through 5—5 of Fig. 4; Fig. 6 is a sectional elevational view thereof taken through 6—6 of Fig. 4, also showing certain parts and portions in elevation to facilitate the illustration; Fig. 7 is a wiring diagram of my means, the indicating arm in the remote signal means being shown by dotted lines in a non-registering position; Fig. 8 is an enlarged sectional elevational view of one of the vehicle retaining or rocking members having switch means in connection therewith, the view being taken through 8—8 of Fig. 2; and, Fig. 9 is a sectional elevational view thereof taken through 9—9 of Fig. 8.

Like characters of reference refer to similar parts and portions throughout the several views of the drawings.

My vehicle locking and control means consists essentially of a vehicle runway A, a vehicle retaining means B, a locking mechanism C, and a remote signal means D.

The vehicle runway A may be merely a stall of suitable length and width, in a garage or other storage space, to receive a conventional automobile or other vehicle. Said runway may be formed by providing a raised portion $A^1$ of any suitable nature at the central portion of the runway or stall, forming wheel passages or runways $A^2$ at the opposite sides of the portion $A^1$, which extend longitudinally relative to the runway or stall, for directing the wheels of a vehicle to the opposite longitudinal sides thereof. The forward or outer end of the portion $A^1$ converges outwardly, as indicated by $A^3$, to facilitate the direction of the wheels of the vehicle into the passages or runways $A^2$.

The means B and the mechanism C are mounted on a unitary base or plate 1 which is secured, by means of bolts 2, to the floor of the garage or storage space in one of the passages or runways $A^2$, as shown in Figs. 1 and 2. On the plate 1 are mounted a pair of journals 3 and 4 in spaced relation, the axes thereof being aligned and positioned transversely with the longitudinal extent of the runway. On and between said journals is pivotally mounted a rocking member 5 of obtuse-angular construction. Said rocking member consists of a pair of obtuse-angular side plates $5^a$ which are secured relative to each other at their inner coincident ends by tie members $5^b$ and at their outer coincident ends by means of tie members $5^c$. Said side plates are pivotally mounted at their apex portions on said journals, the one plate being preferably riveted to the one journal 3, and the other being provided with a trunnion 6 riveted to the plate and loosely mounted in the journal 4, as shown best in Fig. 8. On the tie member $5^c$, at the outer ends of the plates $5^a$, which are the ends toward the outer end of the runway, is revolubly mounted a roller 7 which is adapted to revolve when the driver of the vehicle, locked in the runway, tries to remove the vehicle without unlocking the same.

When the means is unlocked, the member 5 assumes a position, shown by dotted lines in Fig. 2, in which the outer arm rests on the floor or on the plate 1 and in a position to receive a wheel of the vehicle between the side plates $5^a$. As the vehicle is driven inwardly, the member 5 is shifted about its pivotal axis until the same assumes the position, shown by solid lines in Fig. 2. In the latter position, the outer arms with the tie member $5^c$ and the roller 7 prevents the ready removal of the vehicle when the member 5 is locked in such position. If a long vehicle enters the runway, the same may be driven with the one wheel inwardly beyond the member 5, as shown by dotted lines in Fig. 2.

The locking mechanism is enclosed in a casing 11 which is preferably raised above the floor a considerable distance so as to be readily accessible. Said casing is secured to the plate 1 by means of screws $11^a$ extending into the casing from the lower side of the plate.

Within the casing is reciprocally mounted a bolt 12 which is adapted to be forced outwardly by a coil spring 13 positioned within the bolt and engaging at its one end the inner side of the casing. The outer movement of the bolt is limited by means of a stop $12^a$ at the upper side of the bolt engageable with the inner side of the casing. Said bolt is adapted to engage the upper edge of the inner arm of one of the side plates or members $5^a$, as shown in Fig. 4. To said side plate, over the portion adapted to be engaged by said bolt, is secured a guard member 8 which is adapted to prevent tinkering with the bolt. The bolt 12 is retained in an outward or withdrawn position by a detent 14 in the form of an arm which is pivotally mounted at one end between lugs on the wall of the casing opposite the wall through which the bolt 12 extends. The free end of the detent 14 is provided with a downwardly extending portion $14^a$ which is shifted behind the lug $12^a$ when the bolt is shifted outwardly, and positioned in front of the lug $12^a$ when the bolt is withdrawn, as shown by dotted lines. The detent 14 is adapted normally to be shifted into engagement with the bolt by means of a spiral spring 15 at the pivoted portion of the detent.

The bolt is adapted to be tripped by a tripping lever 17 pivotally mounted within the lower portion of the casing and extended with its one and short end $17^a$ beyond the casing through an opening $11^b$ therein. The end $17^a$ of said lever is normally held in a raised position, as indicated by dotted lines in Fig. 4, by means of a strong tension spring 18 secured at its ends to the casing and the opposite arm $17^b$ of the lever 17. On the arm $17^b$ is pivotally mounted the one end of the detent shifting link 16 which extends upwardly beyond the upper side of the bolt and is adapted, when the bolt is withdrawn, to be positioned with its free end in engagement with or below a lug $14^b$ extending to one side of the detent, as shown by dotted lines in Fig. 4. The free end of the link 16 is guided between a pair of pins of lugs $12^b$ at the side of the bolt which shift the link about its pivotal axis with the longitudinal movement of the bolt. When the member 5 is rotated about its pivotal axis for locking a vehicle in the runway, the lower edge of the near side plate $5^a$ engages the outer end of the lever 17 and forces said end downwardly against the tension of the spring 18 and raises the link 16 so that the detent 14 is disengaged from the front side of the lug 12ª permitting the bolt, under tension of the spring 13, to be shifted outwardly. The bolt takes with it, the free end of the link 16 and disengages the same from the lug 14ᵇ of the detent, permitting the latter to drop behind the lug 12ª, as shown by solid lines in Fig. 4.

It will be here noted that the spring 18 is made of such strength so that the lock may not be readily tripped accidentally or purposely unless tripped by the greater force of a vehicle.

At the one side of the bolt 12, opposite the link 16, is rotatably mounted, on a vertical axis, a bolt shifting pinion 19 which meshes with a rack 20 on said side of the bolt. The pinion 19 is mounted in lugs 11ᶜ extending inwardly from the wall of the casing, as shown in Fig. 6. The upper end of the pinion, or the shaft on which the pinion is mounted, is connected by means of a link 21 with the extended end of the rotatable key receiving cylinder of a conventional lock 23 which extends through and is secured to the upper wall of the casing by means of a nut 24. The cylinder 22 receives the operating key 25 in the conventional manner for actuating the lock.

The bolt 12 is prevented from being withdrawn by the key 25 by reason of the position of the detent 14 until the lock is set by a remote control. The switch for actuating the remote control which forms a part of the remote signal means D, is indicated by 33 in Fig. 7, and is connected to a battery 32, or the source of electrical energy, and by means of conductors 30 and 31, with an electro-magnet 27 which is supported by a bracket 28 within the casing 11, as shown in Fig. 4. The electro-magnet is provided with a vertically reciprocating core or armature 26 which is pivotally connected at its lower end, by means of a link 29, to and intermediate the ends of the detent 14. At one side of the detent is also pivotally mounted another detent or pawl 34, the free end of which is normally held in engagement with the upper side of the bolt 12 by means of a spiral spring 35 at the pivotal axis of the pawl 34. Thus, when the bolt is shifted outwardly and the free end of the detent 14 is lodged behind the lug 12ª of the bolt and the operator of the vehicle locked in the runway desires to remove the vehicle he must first actuate the switch 33 which may be placed at a considerable distance from the runway such as in the office of the garage where payment for the storage of the vehicle is to be made. When the switch 33 is actuated, the detent 14 is raised permitting the pawl 34 to swing about its pivotal axis, as shown by dotted lines in Fig. 4, against another lug 12ᶜ at the upper side of the bolt. The operator may then insert the key which was taken with him when the vehicle was locked, rotate the pinion and withdraw the bolt. The withdrawing of the bolt rotates the pawl 34 toward the rear of the casing and permits the detent 14 to be shifted by means of its spring in front of the lug 12ª of the bolt. After the bolt is withdrawn, the key 25 cannot be removed, by reason of the positions of the numerous cylinders or plugs of the lock 23, until the lock is again tripped.

The signal means, there being one for each runway or storage space, is preferably enclosed and consists preferably of a signal arm or indicating finger 45 and a pair of signal lamps 46 and 47. The arm 45 and the lamp 46, which may be of a red color, are automatically controlled by a switch means within the lock casing 11. Said switch means consists of a yieldable switch member 41, secured to and insulated from the lower side of the bolt 12, and contact members 42 and 43 adapted to be engaged by the switch or contact member 41 when the bolt is either shifted outwardly or withdrawn. The contact members 42 and 43 are respectively connected, by means of conductors 48 and 49, with switches 50 and 51, the former of which is adapted to be closed by the indicating arm 45 and manually released and the latter of which is adapted to be connected and disconnected automatically by means of the indicating or signalling arm 45. Said arm 45 is pivotally mounted intermediate its ends within the signal casing and is adapted to be shifted to extreme right angle positions, as indicated by solid and dotted lines in Fig. 7, by means of an armature 52 which is pivotally connected at one end with the end of the indicating arm opposite the indicating portion of the latter. Around the armature 52, are preferably positioned two separate electro-magnets 53 and 54 which are controlled respectively by means of the switches 50 and 51. To the same circuit of the electro-magnet 53, is connected the signalling bulb 46 previously referred to. The shifting of the signalling arm 45 and the retention of the same in its extreme right angle positions is facilitated by means of a tension spring 55 connected in over-center relation relative to the pivotal axis of the indicating arm 45.

The operation of the signalling means is as follows:

When the locking mechanism is tripped, the switch member 41 engages the contact member 42 completing the circuit with the electro-magnet 53 and the signalling bulb 46, the switch 50 having been closed during the previous shifting of the arm 45 to its non-indicating position. The excited electro-magnet 53 will cause the armature 52 to rotate the indicating arm 45 to the solid line position in Fig. 7. The presence of the automobile or other vehicle in the runway or stall will be mechanically indicated by the arm 45, as well as by the bulb 46. As soon as the clerk in the office of the garage or other storage space notices the illumination of the red bulb 46, he may take the time and record the same on a suitable card or the like. The clerk may then manually disconnect the switch 50, thus, disconnecting the electro-magnet 53 and the bulb 46 from the source of electrical energy. The occupation of the stall will, however, be still indicated by the arm 45. When the vehicle is released by the switch 33 and unlocked with the key 25, the switch member 41 will engage the contact member 43 and complete the electric circuit with the electro-magnet 54 causing the indicating arm 45 to be shifted from the solid to the dotted line position, automatically breaking the contact of the switch 51, previously made when the arm 45 was shifted to the solid line position. The shifting of the arm 45 to the dotted line position also connects the switch 50, as previously mentioned.

The lapse of time between the illumination of the bulb 46 and the depression of the switch 33 can readily be calculated at a remote station from the vehicle runway, the shifting of the arm 45 to the dotted line position being made automatically by the locking mechanism when the same is unlocked and is not controlled from the remote station.

In case of accidental and intentional tripping of the locking mechanism, the member 5 cannot be locked in position and the operator may endeavor to drive the vehicle into the stall and permit the member 5 to rest with its lower edge on the bolt. Such position of the member 5 or any position thereof intermediate its extreme positions, will be registered at the remote station or office by a switch means which I have provided in connection with the journal 4. The switch means in connection with the journal 4 may consist of a short contact member 61, mounted on the trunnion 6 and insulated therefrom by a ring 62, and a long arcuate contact member 63 mounted on the side wall of a recess 4ª within the journal 4 around the trunnion 6 and insulated from the journal by an insulating member 64, as shown best in Figs. 8 and 9. This switch means is adapted the actuate the signal bulb 47, which is preferably of green color and is connected with said bulb over the conductors 31 and 48, the latter adapted for controlling the bulb 46 and the electro-magnet 53. The contact member 63 is connected with the one end of the conductor 31, by means of the conductor 67. The contact member 61 is connected, by means of the conductor 66, with the one end of the conductor 48, which is connected with the conductor 68, as shown in Fig. 7. Even though the locking mechanism is tripped and the signaling means actuated and a record made as if a vehicle were in the runway, the position of the member 5, when intermediate its extreme positions, will actuate the switch means in the journal 4 and illuminate the bulb 47, giving information to the remote or control station that the locking mechanism has been sprung. If the member 5 is shifted to an intermediate position in any other manner, the switch means in the journal 4 will permit the simultaneous illumination of the bulbs 46 and 47, giving to the remote station a different signal.

It will be here noted that a limited flash of green light will occur when the member 5 is rotated about its pivotal axis in either direction when the car is driven into or removed from the stall, but such flash will not indicate a position of the locking member and vehicle as mentioned above.

Though I have shown and described a particular construction, combination and arrangement of parts and portions of my locking and control means, and a particular method of locking, signaling and controlling the locking and unlocking of vehicles in runways, I do not wish to be limited to this particular construction, combination and arrangement, nor to the particular method, but desire to include in the scope of my invention the construction, combination and arrangement and method substantially as set forth in the appended claims.

Having thus described my invention, what I claim as new and desire to secure by Letters Patent is:

1. In a means of the class described, a vehicle runway, a rocking member comprising a pair of arms pivotally mounted in said runway adapted to receive the wheel of a vehicle and to be rotated thereby about its pivotal axis, and a locking mechanism in connection with said rocking member for engaging and locking the one arm of the latter when the same is rotated to one extreme position by said wheel.

2. In a means of the class described, a vehicle runway, a rocking member pivotally mounted in said runway adapted to receive the peripheral portion of the wheel of a vehicle and to be rotated thereby about its pivotal axis, and a locking mechanism in association with said rocking member and adapted to be engaged and automatically tripped by one end of said rocking member for automatically locking the same in one extreme position.

3. In a means of the class described, a vehicle runway, an angularly shaped rocking member having an inner and an outer arm and pivotally mounted at its apex in said runway on an axis transverse with the latter so that the rocking member oscillates in line with the runway, and a locking mechanism in association with said rocking member adapted to be engaged and tripped by the normally inner arm of said rocking member for locking said arm in a downward position and the other arm in a raised position.

4. In a means of the class described, a vehicle runway, and a means mounted on the floor of the runway and adapted to receive the peripheral portion of the wheel of a vehicle for automatically raising a portion of the means above the floor level of the runway and means for locking the former means in position with said portion in a raised position to prevent normal removal of said wheel from the runway.

5. In a means of the class described, a vehicle runway, means in said runway adapted to be engaged by a vehicle entering the same, and a locking mechanism in connection with said means for locking the same in a vehicle retaining position, said mechanism comprising a casing, a bolt, spring means for forcing one end of the bolt from the casing, retaining means for retaining the bolt in a withdrawn position, and a trip means extending from said casing adapted to be engaged by said first mentioned means and adapted to shift said retaining means to a non-retaining position.

6. In a means of the class described, a vehicle runway, means in said runway adapted to be engaged by a vehicle entering the same, and a locking mechanism in connection with said means for locking the same in a vehicle retaining position, said mechanism comprising a casing, a bolt, spring means for forcing one end of the bolt from the casing, retaining means for retaining the bolt in a withdrawn position, a trip means extending from said casing adapted to be engaged by said first mentioned means and adapted to shift said retaining means to a non-retaining position, and spring means in connection with said tripping means to prevent abnormal and ready tripping of the same.

7. In a means of the class described, a vehicle runway, means in said runway adapted to be engaged by a vehicle entering the same, and a locking mechanism in connection with said means for locking the same in a vehicle retaining position, said mechanism comprising a casing, a bolt, spring means for forcing one end of the bolt from the casing, retaining means for retaining the bolt in a withdrawn and outer position, tripping means adapted to be engaged by said first mentioned means for shifting said retaining means to permit said bolt to be shifted outwardly, said bolt being connected with said tripping means for shifting the latter to permit said retaining means to engage said bolt to prevent the withdrawal of the same, and a control means connected with said retaining means for shifting the latter to permit the withdrawal of said bolt.

8. In a means of the class described, a vehicle runway, and a rocking member pivotally mounted intermediate its ends on the floor of the vehicle runway, and adapted when in one position to receive the tire of a wheel of a vehicle and when tilted about its pivotal mounting to permit the wheel to be removed from the other end thereof, the first mentioned end of the rocking member being provided with a roller for engaging the tire of the wheel to prevent said wheel from riding over said end of the rocking member when the other end is in a downwardly shifted position.

In testimony whereof, I have hereunto set my hand at Los Angeles, California this 26th day of October 1926.

CLINTON J. WARREN.